(12) United States Patent
Graf (10) Patent No.: US 6,691,365 B2
(45) Date of Patent: Feb. 17, 2004

(54) SIDE MIRROR WIPER

(76) Inventor: Eric C. Graf, 980 Hickory Road, Kelowna, British Columbia (CA), V1X 4K7

( * ) Notice: Subject to any disclaimer, the term of this patent is extended or adjusted under 35 U.S.C. 154(b) by 0 days.

(21) Appl. No.: 10/232,902

(22) Filed: Sep. 3, 2002

(65) Prior Publication Data

US 2003/0041405 A1 Mar. 6, 2003

Related U.S. Application Data (60) Provisional application No. 60/316,227, filed on Sep. 4, 2001.

(51) Int. Cl.$^7$ ............................... B60S 1/56; B60S 1/60
(52) U.S. Cl. .............................. 15/250.003; 15/250.29; 15/250.24
(58) Field of Search .................. 15/250.003, 250.24, 15/250.29, 250.3, 250.002; 359/507, 509; 74/37, 27

(56) References Cited

U.S. PATENT DOCUMENTS

| | | |
|---|---|---|
| 3,526,920 A | 9/1970 | Boyanich |
| 3,685,087 A | 8/1972 | Pittman |
| 3,855,661 A | 12/1974 | Prince |
| 3,968,537 A | 7/1976 | Wagenhofer |
| 4,037,286 A | 7/1977 | Medearis et al. |
| 4,212,091 A | 7/1980 | Jones |
| 4,306,328 A | 12/1981 | Layton |
| 4,339,169 A | 7/1982 | Addison, Jr. |
| 4,457,597 A | 7/1984 | DeGideo |
| 4,873,740 A | 10/1989 | Vahrenwald et al. |
| 5,179,758 A | 1/1993 | Smith et al. |
| 5,203,050 A | 4/1993 | Han |
| 5,353,466 A | 10/1994 | Smith et al. |
| 5,363,236 A | 11/1994 | Han |
| 5,373,605 A * | 12/1994 | Austin ..................... 15/250.24 |
| 5,426,813 A | 6/1995 | Miki et al. |
| 5,446,586 A | 8/1995 | Dornier |
| 5,522,112 A | 6/1996 | Tiffany, III |
| 5,713,098 A * | 2/1998 | Mayer et al. ............. 15/250.24 |
| 5,724,855 A * | 3/1998 | Mayer et al. ............. 15/250.29 |
| 6,032,323 A | 3/2000 | Smith et al. |
| 6,115,875 A | 9/2000 | Klaisner |
| 6,161,247 A | 12/2000 | Breau et al. |
| 2001/0049853 A1 | 12/2001 | Johnson |
| 2002/0100136 A1 | 8/2002 | Waters |

FOREIGN PATENT DOCUMENTS

| | | | |
|---|---|---|---|
| JP | 55-8953 | * 1/1980 | ............ 15/250.003 |

* cited by examiner

Primary Examiner—Gary K. Graham
(74) Attorney, Agent, or Firm—Antony C. Edwards (57) ABSTRACT

A mirror housing contains an electrical motor. A drive arm is mounted to the output shaft of a speed reducer mounted on the motor. A linkage arm rotatably couples the drive arm to a rocker disk which is rotatably mounted within the housing. Three hundred sixty degree rotation of the drive arm by operation of the electric motor imparts a back-and-forth arcuate rocking motion to the rocker disk which in turn imparts a linear back-and-forth motion to a wiper mounted over the mirror glass.

19 Claims, 6 Drawing Sheets

SIDE MIRROR WIPER

CROSS REFERENCE TO RELATED APPLICATION

This application claims priority from U.S. Provisional Patent Application No. 60/316,227 filed Sep. 4, 2001 entitled Side Mirror Wiper.

FIELD OF THE INVENTION

This invention relates to an exterior side mirror which may be mounted to a transport truck, bus or other similar vehicle, and having incorporated therein a wiper blade and operating mechanism for clearing moisture and grime from the surface of the mirror.

BACKGROUND OF THE INVENTION

Drivers of commercial vehicles such as transport trucks, large motorhomes or busses or the like are required to maneuver such vehicles rearwardly in relatively confined spaces. Due to the overall length of the vehicle, the need to accurately judge the position of the vehicle in relation to stationary objects, especially as the vehicle is being backed-up, is relatively difficult since such vehicles do not normally provide a rearward view from a rear window. A clear and unobstructed rearward view from the exterior side mirrors of such vehicles by an operator is therefore paramount.

Often the view seen by the driver through a vehicles' exterior side mirror is distorted or impaired by mud or moisture thrown up by the front wheels during travel or by raindrops or condensation covering the mirror surface during rest. In order to clear the exterior side mirrors one must often physically clean the mirror surface which generally requires that one must exit the drivers' seat of the vehicle, leaving the vehicle unattended. This is a waste of time for the driver and is often only done when the rearview in the mirrors is virtually obliterated. Further, such cleaning is only of a temporary nature, depending on the weather.

It is, therefore, an object of this invention to provide a vehicle exterior rearview mirror having a wiper blade and operating mechanism remotely operable by the driver from inside the vehicle.

Further it is an object of this invention to provide a vehicle exterior rear-view mirror where the wiper will automatically nest in proximity to a side edge of the mirror thereby causing minimal reduction or interference with the viewing surface area of the mirror.

SUMMARY OF THE INVENTION

The exterior side mirror of the present invention has a weather-tight housing which may be secured, by suitable brackets, to prior art mounting arms found on common commercial vehicles. A wiper, in contact with the mirror surface, is operated from within the cab of the vehicle by suitable switches, the switches positioned within reach of the driver. Means for defrosting and/or washing the mirror may be provided for, as well as continuous or intermittent operation of the wiper.

The mirror housing may contain a compact 12-volt electrical motor which may have a speed reducer mechanism mounted over its output shaft. A drive arm may be fixedly mounted to the output shaft from the speed reducer mechanism on the motor so as to be rotatable at a much reduced rate from that of the motor. A linkage arm rotatably couples the drive arm to a rocker disk which is rotatably mounted to an internal mounting plate within the weather-tight housing of the mirror. Three hundred sixty degree rotation of the drive arm by operation of the electric motor imparts a back-and-forth arcuate rocking motion to the rocker disk.

A transversely mounted track is positioned within the mirror housing, for example adjacent the upper and lower transverse edges of the mirror. The track is, by way of example, tee shaped so that, when fixedly mounted to the internal mounting plate, the opposed arms are spaced from the mounting plate. An upper and lower wiper blade mounting bracket is fitted over the transverse track so as to be freely slidable thereon. The transverse track has an internal recess closely conforming the cross-sectional shape of the track. Movement of the wiper blade mounting bracket along the transverse track is enhanced by the composition of the contacting surfaces so as to reduce friction. The wiper blade mounting brackets, when positioned on their respective transverse tracks extend slightly outwardly of the outer surface of the mirror. A wiper blade is mounted to the mounting brackets for movement across and in contact with the exterior surface of the mirror.

Operation of the mirror wiper may be through a cable actuated through the back-and-forth arcuate rocking motion to the rocker disk. The operating cable is fastened to both the upper and lower wiper blade mounting bracket. Upper and lower pairs of corner sheaves are positioned in general tangential alignment with the operating cable fastening points on the wiper blade mounting brackets. As the operating cable passes over the corner sheaves they extend generally parallel to the upper and lower transversely mounted tracks. The operating cable passes outwardly around intermediate sheaves positioned adjacent to the rocker disk and then cross over the surface of the rocker disk. The rocker disk has parallel grooves on its perimeter surface to keep the operating cable separated as it crosses over this disk.

In summary, the side mirror wiper according to the present invention includes a mirror housing defining a cavity. A mirror is mounted to one side of the housing so as to define a wall of the cavity. A drive means is mounted in the housing. A crank is rotatably mounted to the drive means. The drive means rotates the crank continuously, three hundred sixty degrees in a first plane parallel to a second plane containing the mirror. A drive arm is rotatably mounted to a distal end of the crank, at a first end of the drive arm. An opposite second end of the drive arm is rotatably mounted to a rocker. The rocker is pivotally mounted on a pivot in the housing for reciprocating rocking rotation of the rocker in generally the first plane between a first position rotated towards a first side edge of the mirror and a second position rotated towards a second side edge of the mirror opposite the first side edge of the mirror. The second end of the drive arm is pivotally mounted to the rocker between the pivot and a first side of the rocker so that continuous uni-directional three hundred sixty degree rotation of the crank translates the second end of the drive arm generally linearly in a reciprocating linear translation thereby driving the rocker back-and-forth between the first and second positions.

A generally linear first elongate aperture is formed adjacent the mirror and extends between a spaced apart pair of pulleys rotatably mounted in the housing, within the cavity behind the mirror. A flexible member such as a cable frictionally engages the rocker and extends around the pulleys so as to run along the first elongate aperture. The flexible member, where it engages the rocker, is spaced both from the pivot and from the second end of the drive arm so that the rocker forms a bell crank. That is, the linear reciprocating translation of the second end of the drive arm translates the flexible member back-and-forth in a reciprocating motion generally perpendicular to the reciprocating linear motion of the second end of the drive arm so as to thereby translate back-and-forth the flexible member in the run along the first elongate aperture.

A wiper means is mounted to the flexible member through the first elongate aperture, the wiper means slidably mounted to a spaced apart pair of guides adjacent to the mirror so that the translation back-and-forth of the flexible member along the first elongate aperture correspondingly translates the wiper means back-and-forth in wiping engagement over an outer surface of the mirror between the pair of guides.

A second pair of pulleys may be rotatably mounted in the housing in the first plane at an opposite edge of mirror, that is, opposite to the first pair of pulleys. The flexible member also extends around the second pair of pulleys in an endless loop. A second elongate aperture is adjacent the opposite edge of the mirror and is generally parallel to the first elongate aperture. The second elongate aperture is parallel and adjacent to a second run of the flexible member extending between the second pair of pulleys. The wiper means is also mounted to the flexible member through the second elongate aperture.

The rocker may have a semi-circular face in the engagement with the flexible member. At least one channel may be formed in the semi-circular face. The flexible member, where the flexible member is in frictional engagement with the rocker, lies in the at least one channel under tension between a third pair of pulleys rotatably mounted in the housing. The flexible member lies along a length of the channel corresponding to a radial sector, which may be ninety degrees, of the rocker, radial relative to the pivot. The rocker may be a generally semi-circular plate. The channels may be a parallel pair of channels. The third pair of pulleys may be spaced apart from the first pair of pulleys so that the first and third pairs of pulleys define the four corners of a trapezoid. The trapezoid defined by the first and third pairs of pulleys may be a rectangle.

An axis of rotation of the crank and an axis of rotation of the rocker may be both orthogonal to the first and second planes and vertically aligned one above the other. The axis of rotation of the rocker may be vertically above the axis of rotation of the crank.

The housing may be a generally rectangular housing adapted to be mounted, by mounting means, to the side of a vehicle so as to dispose the rectangular housing vertically along its length, and wherein the elongate apertures extend substantially the entire width of the housing across the top and bottom of the housing adjacent the mirror.

The wiper means may be a rigid arm extending the length of the mirror, perpendicular to the elongate aperture, and spaced over and parallel to the outer surface of the mirror. A resilient wiper blade may be mounted to the rigid arm so as to contact the outer surface of the mirror. The guides may be a pair of tracks mounted in the housing behind the elongate apertures. The wiper means may further include a pair of posts slidably mounted on the tracks and extending through the elongate apertures, the rigid arm mounted at its ends to the posts.

The first pair of pulleys may be mounted in upper left and right corners of the housing relative to the outer surface of the mirror when viewed in front elevation. The second pair of pulleys may be mounted in lower left and right corners of the housing, again relative to the outer surface of the mirror when viewed in front elevation. The third pair of pulleys may be mounted directly below the first pair of pulleys on either side of the rocker. The pivot may be below and centered between the third pair of pulleys. The crank may be directly below the pivot. The second pair of pulleys may be below the crank.

BRIEF DESCRIPTION OF THE DRAWINGS

FIG. 3 is a sectional view taken on line 3—3 of FIG. 1a.

FIG. 3b is an enlarged partially cut away view of a portion of FIG. 3a.

DETAILED DESCRIPTION OF EMBODIMENTS OF THE INVENTION

With reference to the drawing figures wherein similar characters of reference denote corresponding parts in each view, generally rectangularly shaped vehicle mirror 10 is mounted to an exterior housing 12. Housing 12 has rearwardly projecting brackets 12a which facilitate mounting of the mirror to mounting arms 14 of a vehicle (not shown).

Housing 12 contains a 12 Volt electric motor 16, mounted in the rear of the housing, which may be remotely operated by a driver from within the vehicle. The mirror will have an integrated heater for frost removal as well as integrated mirror washers. They will be run by the 12 Volt circuit with separate switches. A rotation-reducing device 18 such as reduction gears within gear housing is mounted to the output drive shaft 16a of electric motor 16 so that rotational speed transmitted from drive shaft 16a to an out-put shaft 20 is substantially reduced. A crank arm 24 is mounted to the distal end of shaft 20. Crank arm 24 rotates three hundred sixty degrees in direction A in unison with the rotation of out-put shaft 20.

Figure 4:
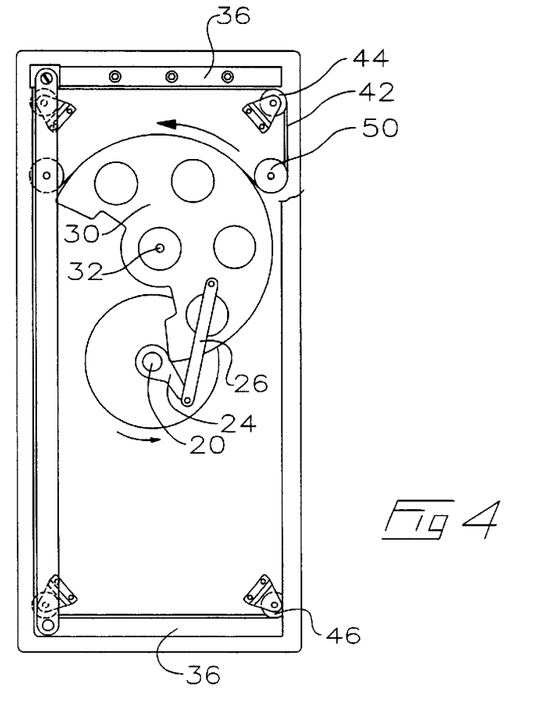
FIG. 4 is a front elevational view of the vehicle mirror with the mirror glass removed.
Figure 4A:
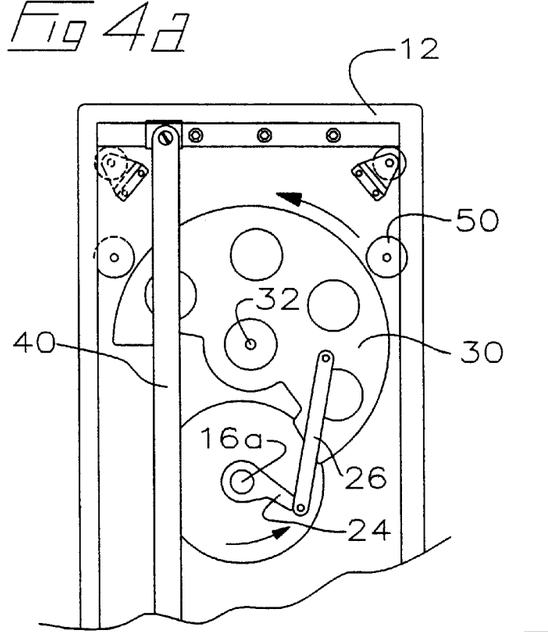
FIG. 4a and 4b illustrate the front elevational view of the vehicle mirror shown in FIG. 4 with the wiper travelling progressively across the surface of the mirror.
Figure 4B:
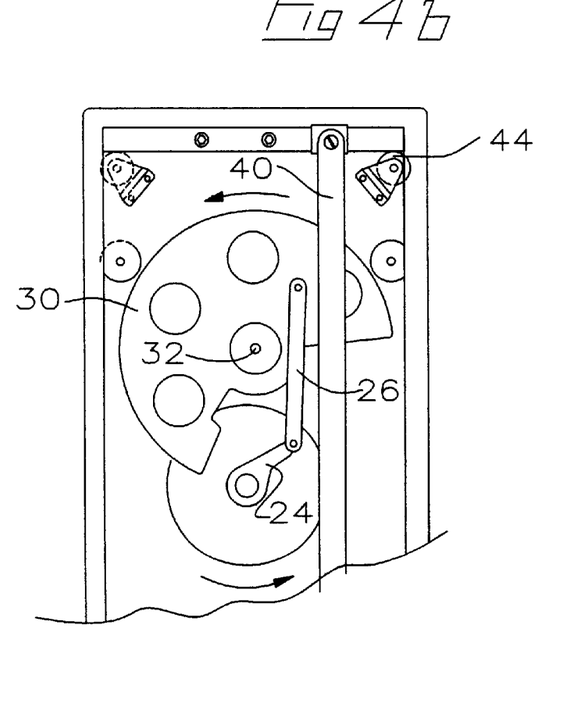
Figure 4C:
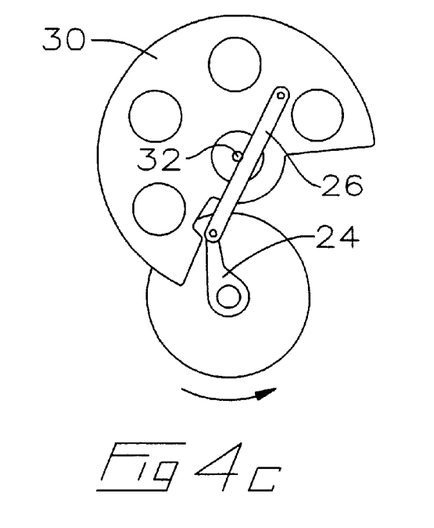
FIG. 4c is the view of FIG. 4b partially cut away showing the further cyclical rotation of the crank and rocker of the mirror wiper mechanism.
Figure 4D:
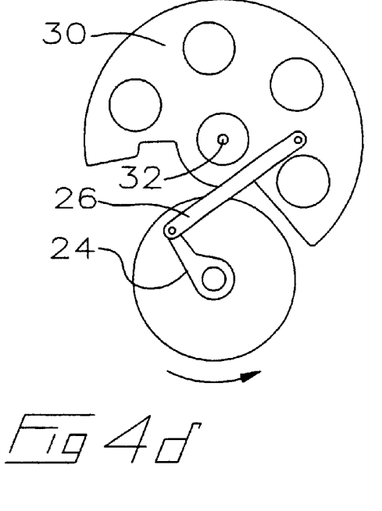
FIG. 4d is the view of FIG. 4c showing further cyclical rotation of the crank arm and rocker.
Figure 4E:
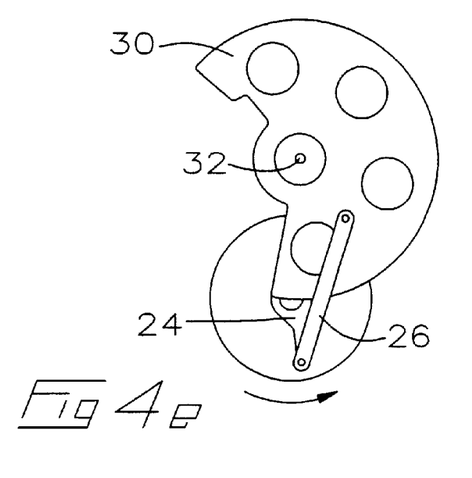
FIG. 4e is the view of FIG. 4d showing further cyclical rotation of the crank and rocker.
Figure 5:
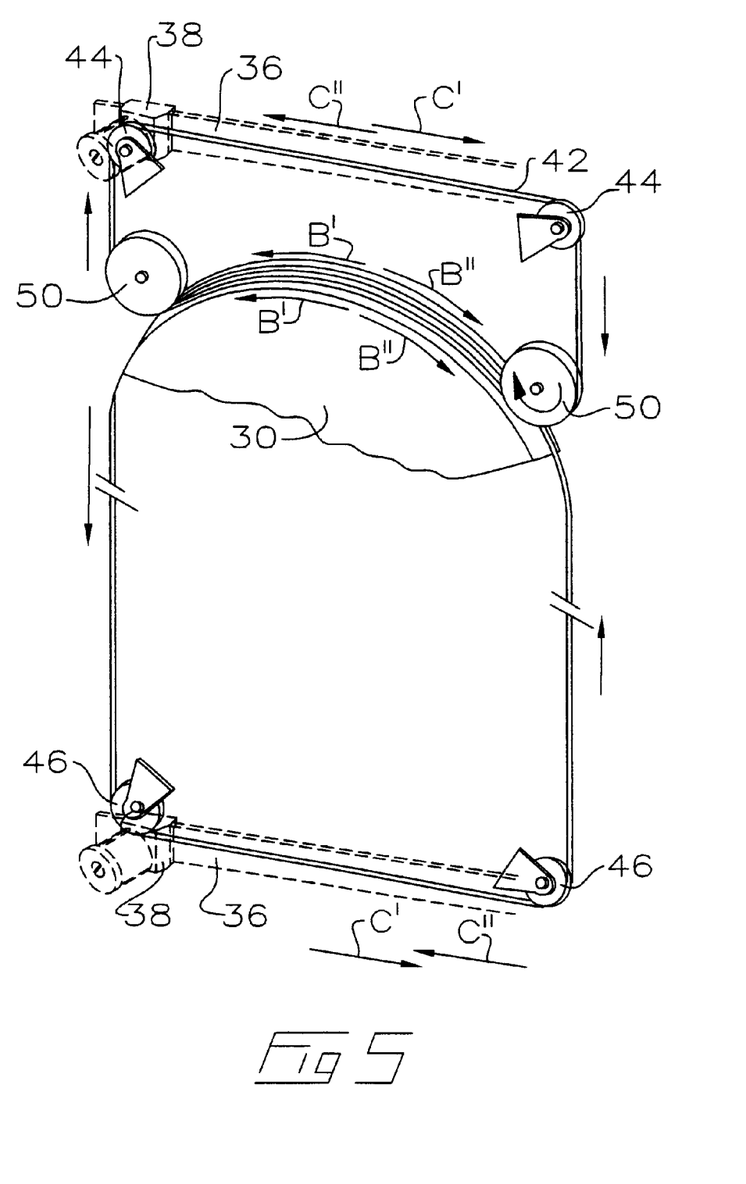
FIG. 5 illustrates the direction of movement of the operating cable.

A linkage arm 26 is rotatably mounted to, so as to extend between crank arm 24 and rocker disk 30. Rocker disk 30 is rotatably mounted within housing 12 on a pivot pin 32 for rotation in plane D. Pin 32 and out-put shaft 20 are parallel and positioned in the housing in general vertical alignment. Operation of motor 16 transmits rotation to out-put shaft 20 and arm 24, which, in turn, results in a generally vertical oscillation of linkage arm 26. Since the connection of linkage arm 26 to rocker disk 30 is radially offset, that is distal end 24a of arm 24 reaches top and bottom dead center. (FIGS. 4c and 4e respectively) before distal end 26a of arm 26 reaches top dead center, so that distal end 26a never reaches top dead center relative to pin 32 and thus disc 30 has come to a standstill in FIG. 4c, has reversed direction in FIG. 4d, and has once again come to a standstill in FIG. 4e. The unidirectional rotation of arm 24 and the corresponding oscillation of linkage arm 26 imparts a back-and-forth arcuate rocking motion in direction B to disk 30 about pin 32 as seen in the cyclical sequence of views in FIGS. 4a–4e.

Figures 1, 1A:
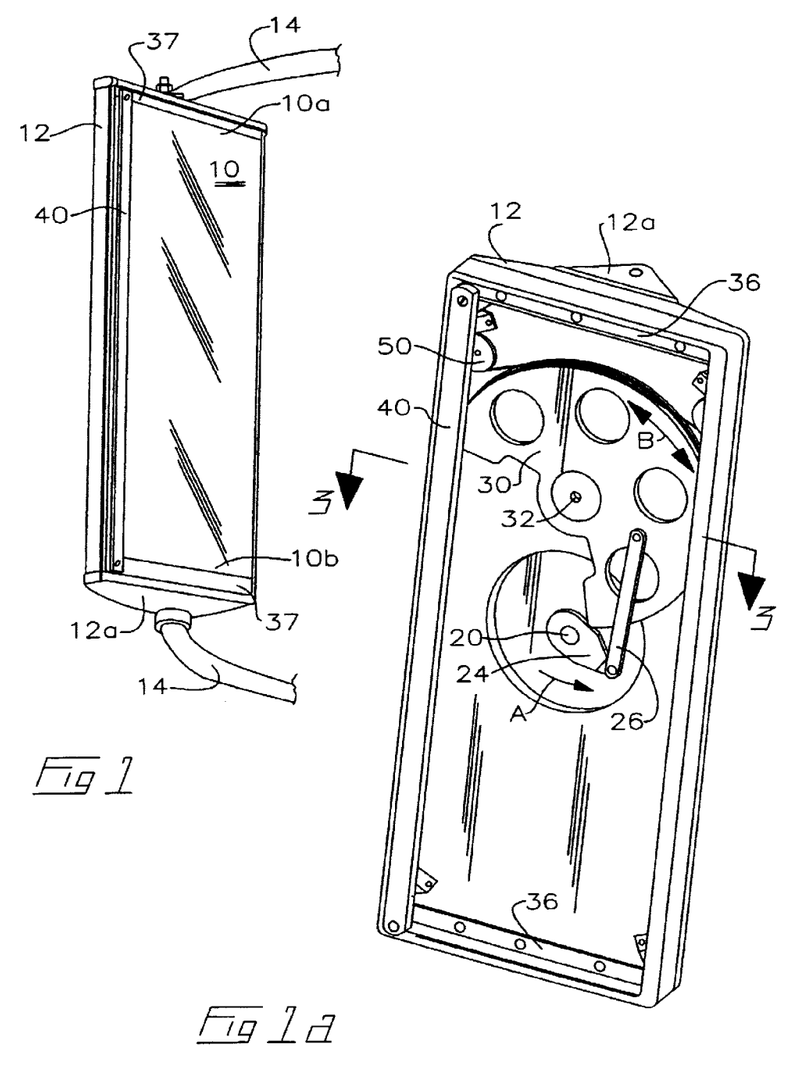
FIG. 1, is a perspective view of the mirror of the present invention mounted to typical support arms of a commercial vehicle.
FIG. 1a is a partially cut-away perspective view of the mirror of the present invention.
Figure 2:
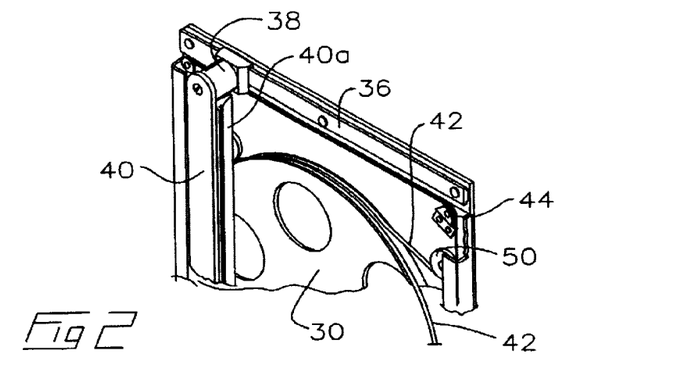
FIG. 2 is an enlarged perspective view of the mirror wiper operating system.
Figure 3:
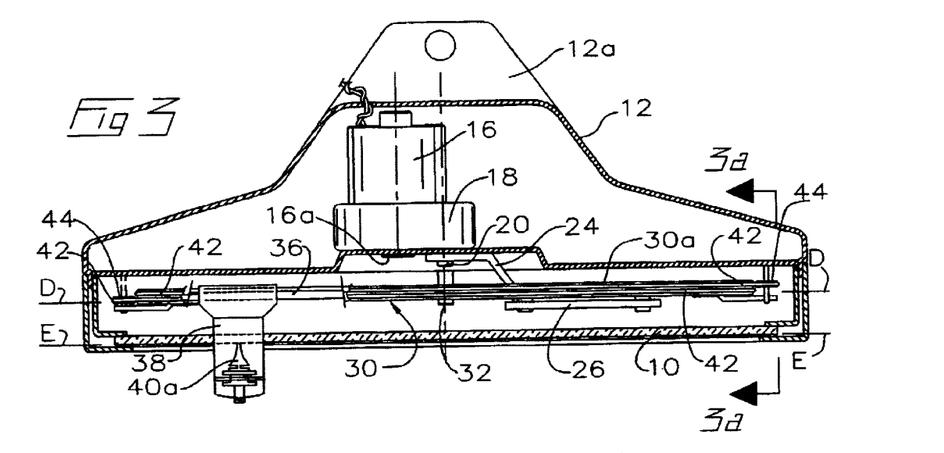
Figure 3A:
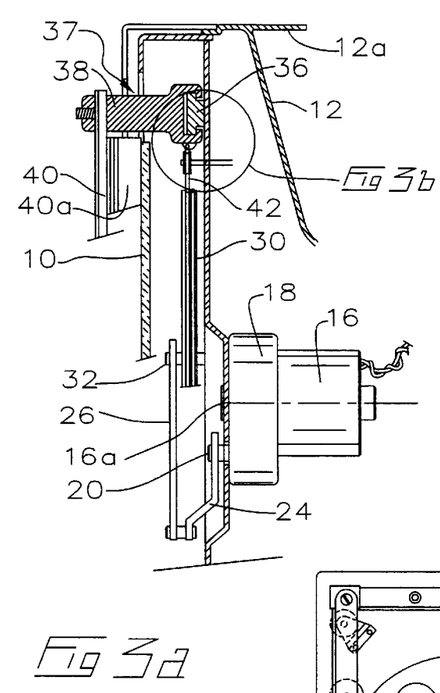
FIG. 3a is a sectional view taken on line 3a—3a of FIG. 3.
Figure 3B:
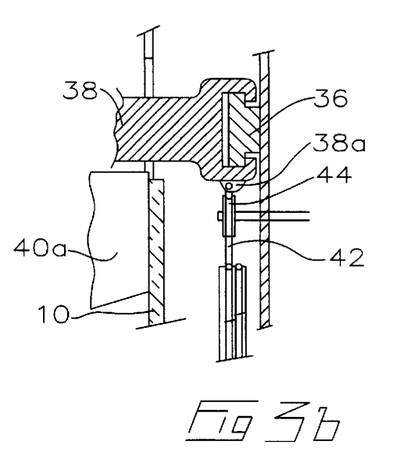

A pair of wiper blade mounting tracks 36 are mounted within the housing, one each adjacent and parallel to the upper and lower transverse edges 10a and 10b respectively of mirror 10. Track 36 is generally T-shaped in cross section, as may be seen in FIG. 3a. Each track 36 supports a wiper blade mounting bracket 38 slidably mounted therein, bracket 38 having an internal recess of similar cross sectional T-shape. A wiperblade 40, which may be a standard automobile replacement wiper blade, is mounted at either end to upper and lower mounting brackets 38 by bolting or other fastening means so as to engage the resilient blade 40a of wiperblade 40 against the exterior surface lying in plane E of mirror 10.

Wiper blade 40 is drawn transversely across the mirror surface by an operating cable 42, which is securely fastened to mounting brackets 38. Cable 42 passes around upper and lower pairs of corner wheels, pulleys or sheaves 44 and 46 respectively, mounted in housing 12. Corner sheaves 44 and 46 are positioned so that cable 42 aligns with the operating cable fastening points 38a on mounting bracket 38, sand is parallel to wiper blade mounting tracks 36, cable 42 mounted to brackets 38 at fastening points 38a by clamps, screws or other fasteners.

Operating cable 42 passes around the pair of upper sheaves 44 and extends downwardly to and around intermediate sheaves 50 rotatably mounted adjacent rocker disk 30. Cable 42 passes under sheaves 50 and over rocker disk 30 along upper surface 30a in a pair of grooves 30b provided to separate operating cable 42 as it passes twice over upper surface 30a.

As crank arm 24 rotates from bottom dead center to top dead center, the frictional engagement of cable 42 with the upper surface 30a of disk 30 also draws both portions of the cable 42 in contact with surface 30a, that is each portion in the pair of grooves 30b, in direction of arrow B'. This, results in operating cable 42 pulling wiper blade mounting brackets 38 in the opposite direction, that is, in the direction of arrows C'. Wiper blade 40 is thus drawn across mirror 10. As drive arm 24 is rotated past the vertical, that is, from top dead center to bottom dead center, rocker disk 30 is rotated in direction B", opposite to that of arrow B'which then draws upper blade 40 across the mirror surface in the opposite direction, that is, in direction C", opposite to arrow C'.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A side mirror wiper comprising:
    a mirror housing defining a cavity and having a mirror mounted to one side of said housing so as to define a wall of said cavity,
    drive means mounted in said housing, a crank rotatably mounted to said drive means, said drive means for three hundred sixty degree rotation of said crank in a first plane parallel to a second plane containing said mirror,
    a drive arm rotatably mounted to an end of said crank at a first end of said drive arm, an opposite second end of said drive arm rotatably mounted to a rocker, said rocker pivotally mounted on a pivot in said housing for reciprocating rocking rotation of said rocker in generally said first plane between a first position rotated towards a first side edge of said mirror and a second position rotated towards a second side edge of said mirror opposite said first side edge of said mirror, said second end of said drive arm pivotally mounted to said rocker between said pivot and a first side of said rocker so that continuous uni-directional three hundred sixty degree rotation of said crank translates said second end of said drive arm generally linearly in a reciprocating linear translation thereby driving said rocker back-and-forth between said first and second positions,
    a generally linear first elongate aperture formed adjacent said mirror and extending between a spaced apart pair of pulleys rotatably mounted in said housing within said cavity behind said mirror, a flexible member frictionally engaging said rocker and extending around said pulleys so as to run along said first elongate aperture, said flexible member, where it engages said rocker, spaced both from said pivot and from said second end of said drive arm so that said rocker forms a bell crank wherein said linear reciprocating translation of said second end of said drive arm translates said flexible member back-and-forth in a reciprocating motion generally perpendicular to said reciprocating linear motion of said second end of said drive arm so as to thereby translate back-and-forth said flexible member in said run along said first elongate aperture,
    wiper means mounted to said flexible member through said first elongate aperture, said wiper means slidably mounted to a spaced apart pair of guides adjacent to said mirror so that said translation back-and-forth of said flexible member along said first elongate aperture correspondingly translates said wiper means back-and-forth in wiping engagement over an outer surface of said mirror between said pair of guides.

2. The wiper of claim 1 further comprising a second pair of pulleys rotatably mounted in said housing in said first plane at an opposite edge of mirror opposite to said first pair of pulleys,
    wherein said flexible member also extends around said second pair of pulleys in an endless loop,
    a second elongate aperture adjacent said opposite edge of said mirror and generally parallel to said first elongate aperture and parallel and adjacent to a second run of said flexible member extending between said second pair of pulleys,
    said wiper means also mounted to said flexible member through said second elongate aperture.

3. The wiper of claim 2 wherein said rocker has a semi-circular face in said engagement with said flexible member.

4. The wiper of claim 3 wherein at least one channel is formed in said semi-circular face, and wherein said flexible member, where said flexible member is in said frictional engagement with said rocker, lies in said at least one channel under tension between a third pair of pulleys rotatably mounted in said housing, along a length of said at least one channel corresponding to a radial sector of said rocker, radial relative to said pivot.

5. The wiper of claim 4 wherein an axis of rotation of said crank and an axis of rotation of said rocker are both orthogonal to said first and second planes and vertically aligned one above the other.

6. The wiper of claim 5 wherein said axis of rotation of said rocker is vertically above said axis of rotation of said crank.

7. The wiper of claim 4 wherein said radial sector is generally ninety degrees.

8. The wiper of claim 4 wherein said third pair of pulleys are spaced apart from said first pair of pulleys so that said first and third pairs of pulleys define the four corners of a trapezoid.

9. The wiper of claim 8 wherein said trapezoid defined by said first and third pairs of pulleys is a rectangle.

10. The wiper of claim 9 wherein said housing is a generally rectangular housing adapted to be mounted, by mounting means, to the side of a vehicle so as to dispose said rectangular housing vertically along its length, and wherein said elongate apertures extend substantially the entire width of said housing across the top and bottom of said housing adjacent said mirror.

11. The wiper of claim 10 wherein said wiper means is a rigid arm extending the length of said mirror, perpendicular to said elongate aperture, and spaced over and parallel to said outer surface of said mirror, a resilient wiper blade mounted to said rigid arm so as to contact said outer surface of said mirror.

12. The wiper of claim 11 wherein said guides are a pair of tracks mounted in said housing behind said elongate apertures, said wiper means further comprising a pair of posts slidably mounted on said tracks and extending through said elongate apertures, said rigid arm mounted at its ends to said posts.

13. The wiper of claim 12 wherein said first pair of pulleys are mounted in upper left and right corners of said housing relative to said outer surface of said mirror when viewed in front elevation.

14. The wiper of claim 13 wherein said second pair of pulleys are mounted in lower left and right corners of said housing relative to said outer surface of said mirror when viewed in front elevation.

15. The wiper of claim 14 wherein said third pair of pulleys are mounted directly below said first pair of pulleys on either side of said rocker, wherein said pivot is below and centered between said third pair of pulleys, and wherein said crank is directly below said pivot, and wherein said second pair of pulleys are below said crank.

16. The wiper of claim 15 wherein said rocker is a generally semi-circular plate.

17. The wiper of claim 16 wherein said flexible member is a cable.

18. The wiper of claim 4 wherein said at least one channel is a parallel pair of channels.

19. The wiper of claim 18 wherein said flexible member is a cable.

* * * * *